United States Patent [19]
Breitbach

[11] 3,835,427
[45] Sept. 10, 1974

[54] SOLID-BORNE SOUND TRANSDUCERS

[76] Inventor: Elmar Breitbach, 10, Bornbreite, Gottingen, Germany

[22] Filed: Mar. 19, 1973

[21] Appl. No.: 342,429

[30] Foreign Application Priority Data
Mar. 20, 1972 Germany............................ 2213373

[52] U.S. Cl.................. 335/231, 179/115.5, 340/17
[51] Int. Cl. .............................................. H01f 7/00
[58] Field of Search...... 335/231, 306; 179/115.5 R, 179/119; 308/10

[56] References Cited
UNITED STATES PATENTS
2,951,190   8/1960   Baermann........................... 335/231
3,434,084   3/1969   Milligan............................. 308/10 X
3,582,874   6/1971   Fedoseenko......................... 340/17
3,629,753   12/1971  Kawabe et al...................... 308/10 X

*Primary Examiner*—George Harris
*Attorney, Agent, or Firm*—Wenderoth, Lind & Ponack

[57] ABSTRACT

A solid-borne sound transducer for the precise measurement of vibrations consisting of a pot-shaped stator, a bell-shaped oscillator located coaxially within the stator and supported by a supporting magnet system mounted on the stator and the oscillator. At least two annular magnet systems, each consisting of two concentrically arranged annular magnets, are provided on the stator and the oscillator for centring and maintaining the oscillator within the stator without any mechanical or physical contact therebetween.

8 Claims, 3 Drawing Figures

SOLID-BORNE SOUND TRANSDUCERS

BACKGROUND OF THE INVENTION

This invention relates to a solid-borne sound transducer, of the kind used for the precise measurement of vibrations, particularly low-frequency vibrations, and comprising a rotationally symmetrical stator which acts as receiver for the solid-borne sound waves, is pot-shaped and acts simultaneously as casing for the solid-borne sound transducer, a mushroom-shaped component which is disposed in the interior of the stator coaxially therewith and is rigidly connected thereto, a rotationally symmetrical oscillator which is disposed so as to be centred axially and to be movable in the direction of the axis of the stator in the interior thereof, and is constructed in the shape of a bell, the bell-shape at least substantially surrounding the mushroom-shaped part of the stator without making contact therewith, a supporting magnet system, comprising at least two magnets, which is disposed in the axis of the stator-oscillator system, one of the two magnets being connected rigidly to the stator and the other to the oscillator, both magnets being disposed coaxially with one another in the direction of motion of the oscillator and magnetised in the opposite direction so that the magnet of the stator is capable of supporting the magnet of the oscillator, including the oscillator itself, means for guiding and centring the oscillator in the direction of the axis of the stator, and at least one single magnet which is disposed outside the supporting magnet system.

Solid-borne sound transducers of such kind have several disadvantages.

The first disadvantage can be seen from the fact that the necessary centring of the oscillatory system is produced by mechanical supplementary springs which, owing to their softness may easily become broken even during transport of the transducer rendering the latter unfit for operation.

The second disadvantage results from mechanical friction in the mechanical centring which, for a certain required minimum level of sensitivity and resolution capacity of the solid-borne sound transducer, necessitates a corresponding minimum value for the mass of the oscillatory system which, furthermore has to be greater as the necessary natural frequency of the transducer is less. As is generally known, when extremely low natural frequencies are demanded as well as extremely high resolution capacities and sensitivity, this leads to very considerable masses.

SUMMARY OF THE INVENTION

The present invention aims at obviating the foregoing disadvantages, and to this end consists in a solid-borne sound transducer for the precise measurement of vibrations, comprising a rotationally symmetrical pot-shaped stator constituting a receiver for the solid-borne sound and forming a casing of the transducer, an upright member fixed centrally to the base within the stator and supporting a first of at least two magnets of a supporting magnet system of the transducer, a rotationally symmetrical bell-shaped oscillator located coaxially within the stator and disposed so as to be capable of movement in the direction of the stator axis, said oscillator at least substantially surrounding said first magnet and said upright member without touching them and comprising a cylindrical carrier portion which carries at least two axially spaced apart annular magnets each of which forms part of one of at least two annular magnet systems additional to said supporting magnet system and each of which comprises two concentrically arranged annular magnets, a second magnet of said supporting magnet system carried coaxially within said oscillator above said first magnet of the supporting magnet system, said first and second magnets being disposed coaxially with one another in the direction of movement of the oscillator and being magnetised in opposite senses in such a manner that the first magnet is capable of supporting the second magnet together with the oscillator, the other of said two concentrically arranged annular magnets of each of said two annular magnet systems being mounted on the circumferential wall of the stator and surrounding said one annular magnet in spaced relationship, the annular magnets being of the same thickness and being magnetised radially in such a manner that the facing annular surfaces of each two concentrically arranged magnets have the same poles in the air gap formed therebetween.

Advantageously, two annular magnet systems are provided, one annular magnet system being disposed above and the other below the supporting magnet system, the arrangement being such that the annular magnet systems lie coaxially with the supporting magnet system.

Preferably, one of the annular magnets of the lower annular magnet system is disposed on the lower part of the stator and one of the annular magnets of the upper annular magnet system is disposed on the head of the stator while the other annular magnet of the lower annular magnet system is disposed on the lower end of the bell of the oscillator and the other annular magnet of the upper annular magnet system is disposed on the head of the bell.

Conveniently, the distance between the central planes of the annular magnet systems of the stator is the same as that in the annular magnet systems of the oscillator. The annular magnets of the oscillator may be mounted in such a way in relation to the magnet of the supporting magnet system which is connected to the oscillator that they coincide in height with the annular magnets of the stator when the oscillator is in its equilibrium position. The annular magnets are preferably magnetised to such a strength that in the deflections from the equilibrium position which are intended for the oscillator the absolute amount of the differential stiffness of the force-distance characteristic of the annular magnet systems together is not greater than that of the supporting magnet system, preferably slightly less.

As will be shown below, a solid-borne sound transducer constructed in such manner no longer requires mechanical centring means for the oscillator and has a stiffness of the whole spring system which is as small as desired in spite of the high supporting capacity of the supporting magnet system.

These two effects are achieved by the addition of the annular magnet systems. They have two separate effects.

The first advantageous effect of the annular magnet systems consists in the fact that they take over the centring and axial guiding of the oscillator. Since the annular magnet systems are disposed above and below the supporting magnet system, reliable guiding is guaranteed. In the equilibrium position of the oscillators the annular magnets of both annular magnet systems are situated exactly opposite one another. The annular magnet systems force the oscillator constantly into its axial position. This stabilisation takes place without the existence of any mechanical connections between the stator and the oscillator and so it operates entirely without friction. This makes it possible to achieve the extremely high level of sensitivity and resolution capacity which was not attainable with previous solid-borne sound transducers at extremely low frequencies.

The second advantageous effect of the annular magnet systems can be seen in the fact that through them, within a range determined by the amplitudes of the oscillator, the stiffness of the overall magnet system formed by the supporting magnet system and the annular magnet systems can be kept to any desired minimum although the supporting capacity of the supporting magnet system is fully retained.

DESCRIPTION OF THE DRAWINGS

In order that the invention may be more readily understood, reference is made to the accompanying drawings which illustrate diagrammatically and by way of example one embodiment thereof, and in which.

DESCRIPTION OF THE PREFERRED EMBODIMENT

Figure 1:
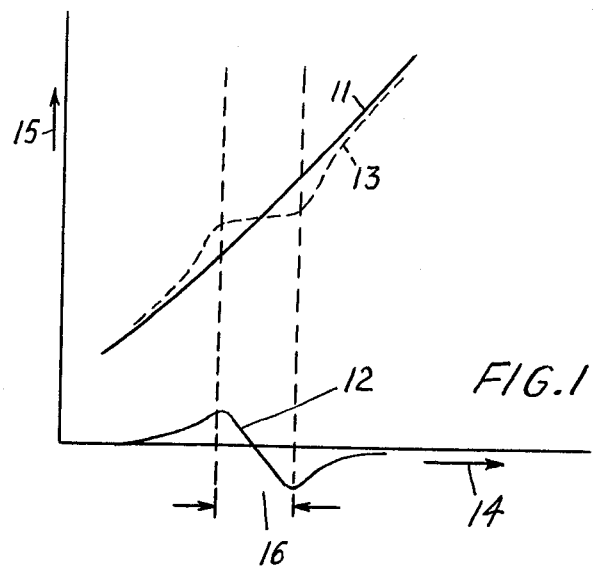
FIG. 1 is a graphic representation of the stiffness of the overall magnet system of the solid-borne sound transducer in accordance with the invention.

Referring to FIG. 1 of the drawings, the force 15 at any given time is plotted against the deflection of the oscillator, the equilibrium position of which is entered on the deflection axis 14. Line 11 represents the force-deflection graph for the supporting magnet system; it is, at least to a great extent, a straight line. Line 12 represents the force-deflection graph only for the two annular magnet systems. With the oscillator in the equilibrium position none of the annular magnet systems is generating a force in the axial direction since their rings are then exactly opposite one another. When the oscillator is deflected down from the equilibrium position, both annular magnet systems generate a downwardly acting force and in the case of upward deflections there is, correspondingly, an upwardly acting force produced, as is represented by line 12.

Since the supporting magnet system and the annular magnet systems are rigidly coupled a superposition of the two graphs 11 and 12 occurs inevitably when the oscillator is deflected; the result is the graph 13. The peculiarity of this graph is that within a zone determined by the thickness of the annular magnets it has a very flat course and in fact it can be made to run as flat as is desired through the strength of magnetisation of the annular magnets at any given time. It can be made so flat that it runs horizontally in the range 16 in question and, indeed, it could be of such a shape that it fell instead of rising. However, the two cases in which there is zero and negative rise are irrelevant for solid-borne sound transducers. Their significant feature is that the characteristic graph can be made to run somewhat less than horizontal. The overall magnet system then has minimal stiffness but still good supporting capacity, precisely what is required for an ideal solid-borne sound transducer.

By comparison with solid-borne sound transducers operating with mechanical springs, however, the transducer of the invention also has the advantage of being safe in transport. This is because the fine springs essential to the known solid-borne sound transducers, which are susceptible to jolts, can then be dispensed with. Furthermore, by comparison with all the previously known solid-borne sound transducers there is the advantage that since the gradient of the operating range 16 of the transducer can be made as flat as desired without precluding complete freedom from friction, the mass of the oscillator can be kept extremely small. The solid-borne sound transducer becomes as small and light as is desired, by comparison with all those with which, hitherto, it has been possible to measure the same low frequencies.

Figure 2:
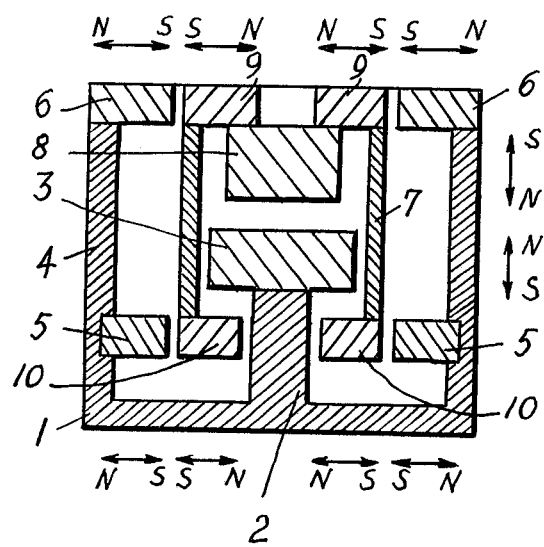
FIG. 2 shows the construction of one embodiment of the transducer in accordance with the invention.

Referring to FIG. 2 the solid-borne sound transducer comprises a stator 1 which is pot or cup-shaped and which forms the casing of the transducer. In the centre of its base or console the stator 1 carries a column 2 which in turn supports a circular magnet 3 which is the supporting magnet of the supporting magnet system of the transducer. The magnet 3 and the column 2 constitute a mushroom-shaped body. Disposed on the circumferential wall 4 of the stator are two annular magnets 5 and 6; the annular magnet 5 is situated below, the annular magnet 6 above the magnet 3 of the supporting magnet system. A bell-shaped oscillator 7 comprises a magnet 8 which constitutes the second member of the supporting magnet system 3, 8. The magnet 8 is disposed coaxially above the magnet 3. Both magnets 3 and 8 are magnetised in opposite senses so that the magnet 8 is repelled by the magnet 3 and freely suspended. This would not be possible without stabilising and guiding means. These means are constituted by annular magnets 9 and 10. The annular magnet 9 is disposed above the magnet 8 in such a way that when the magnet 8 is in the equilibrium position the magnet 9 lies exactly level with the annular magnet 6 of the stator by which it is surrounded. The annular magnet 10 is disposed below the magnet 8 in such a way that it lies, when the magnet 8 is in the equilibrium position, exactly level with the annular magnet 5 of the stator by which it is surrounded. The magnet rings 5 and 10, or 6 and 9 form respectively one of the annular magnet systems. The directions in which the various magnets are magnetised are shown by the arrows N-S. Both magnets of all the magnet systems are magnetised in opposite senses. The function of the two annular magnet systems 5, 10 and 6, 9 is to prevent the oscillator 7, which is suspended completely freely in space, supported only by magnetic forces, from effecting any other than axial movements. A further function of the two annular magnet systems is to flatten out the force-deflection characteristic graph within the operational range of the oscillator. The magnets 3, 5 and 6 may be constructed as electromagnets. However, if the modification of sensitivity at will is dispensed with, the solid-borne sound transducer may be provided throughout with permanent magnets.

Figure 3:
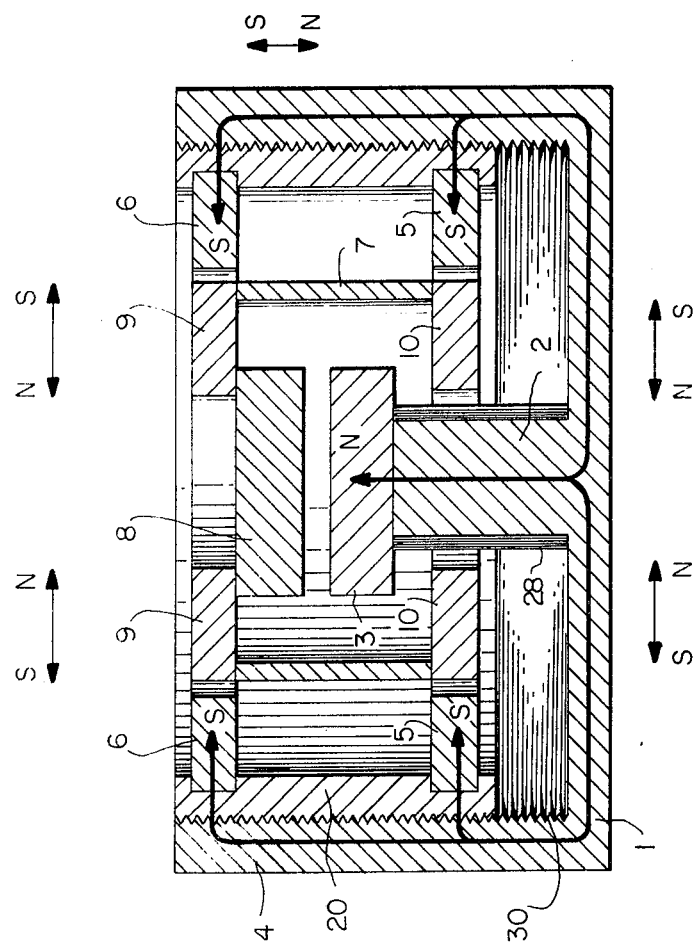
FIG. 3 shows a modified embodiment of the transducer in accordance with the invention.

The construction of the illustrated transducer may include the following features:

1. At least one of the annular magnets of each annular magnet system may be made capable of sliding in the axial direction by the provision of means such as cylindrical member 20, which supports magnets 5 and 6, being axially movable in wall 4 by means of cooperating screw threads 30, as shown in FIG. 3.

2. At least one of the two magnets of each magnet system, that is to say both of the supporting magnet system and also of the annular magnet systems is constructed as an electro-magnet, such as by the provision of field coil 28 in FIG. 3. To avoid current supplies to the oscillator, the magnets of the stator are chosen for the electromagnets.

3. The components by which the magnets of the stator are interconnected and those of the oscillator are interconnected may be made from magnetically soft material; the magnets may also be mounted in such a way relative to one another that their magnetic fluxes are added.

4. The polar surfaces of at least the magnets in the supporting magnet system may be so constructed that with the possible horizontal displacements of the two magnets relative to one another the horizontal forces acting between them are negligible. The latter can be achieved, for example, if the diameter of one of the two magnets of the supporting magnet system, preferably that of the oscillator, is smaller than that of the stator. But this could also be achieved by suitable convexity of the polar surfaces.

The advantageous improvements to the solid-borne sound transducer which can be obtained by these four measures are as follows.

1. By the first measure: axial adjustability of the annular magnet systems.

2. By the second measure: Modification at will of the supporting capacity of the supporting magnet system as well as of the differential stiffness of the characteristic graphs of the annular magnet systems and consequently of the natural frequency of the solid-borne sound transducer within wide limits.

3. By the third measure: Optimal utilisation of the energy stored in the magnets.

4. By the fourth measure: On the one hand, in the case of horizontal displacement of the oscillator, preventing the magnet of the oscillator from getting into heterogeneities of the magnet of the stator; on the other hand avoiding the tendency of both magnets of the supporting magnet to utilise horizontally acting components of the repelling forces for horizontal deflections of the oscillator.

I claim:

1. A solid-borne sound transducer for the precise measurement of vibrations, comprising a rotationally symmetrical pot-shaped stator constituting a receiver for the solid-borne sound and forming a casing of the transducer, an upright member fixed centrally to the base within the stator and supporting a first of at least two magnets of a supporting magnet system of the transducer, a rotationally symmetrical bell-shaped oscillator located coaxially within the stator and disposed so as to be capable of movement in the direction of the stator axis, said oscillator at least substantially surrounding said first magnet and said upright member without touching them and comprising a cylindrical carrier portion which carries at least two axially spaced apart annular magnets each of which forms part of one of at least two annular magnet systems additional to said supporting magnet system and each of which comprises two concentrically arranged annular magnets, a second magnet of said supporting magnet system carried coaxially within said oscillator above said first magnet of the supporting magnet system, said first and second magnets being disposed coaxially with one another in the direction of movement of the oscillator and being magnetised in opposite senses in such a manner that the first magnet is capable of supporting the second magnet together with the oscillator, the other of said two concentrically arranged annular magnets of each of said two annular magnet systems being mounted on the circumferential wall of the stator and surrounding said one annular magnet in spaced relationship, the annular magnets being of the same thickness and being magnetised radially in such a manner that the facing annular surfaces of each two concentrically arranged magnets have the same poles in the air gap formed therebetween.

2. A transducer as claimed in claim 1, wherein two annular magnet systems are provided, one annular magnet system being disposed above and the other below the supporting magnet system, the arrangement being such that the annular magnet systems lie coaxially with the supporting magnet system.

3. A transducer as claimed in claim 2, wherein one of the annular magnets of the lower annular magnet system is disposed on the lower part of the stator and one of the annular magnets of the upper annular magnet system is disposed of the head of the stator while the other annular magnet of the lower annular magnet system is disposed on the lower end of the bell of the oscillator and the other annular magnet of the upper annular magnet system is disposed on the head of the bell.

4. A transducer as claimed in claim 1, wherein the distance between the central planes of the annular magnet systems of the stator is the same as that in the annular magnet systems of the oscillator.

5. A transducer as claimed in claim 1, wherein the annular magnets of the oscillator are mounted in such a way in relation to the magnet of the supporting magnet system which is connected to the oscillator that they coincide in height with the annular magnets of the stator when the oscillator is in its equilibrium position.

6. A transducer as claimed in claim 5, wherein the annular magnets are magnetised to such a strength that in the deflections from the equilibrium position which are intended for the oscillator the absolute amount of the differential stiffness of the force-distance characteristic of the annular magnet systems together is not greater than that of the supporting magnet system, preferably slightly less.

7. A transducer as claimed in claim 1, wherein conventional means are provided, by which one of the annular magnets of each of the annular magnet systems can slide in the direction of the axis of the solid-borne sound transducer.

8. A transducer as claimed in claim 1, wherein at least one of the two magnets of each of the magnet systems, preferably the one connected with the stator, is constructed as an electromagnet.

* * * * *